Jan. 16, 1940.     L. D. NILSON     2,187,279
JACK STRUCTURE
Filed July 18, 1938
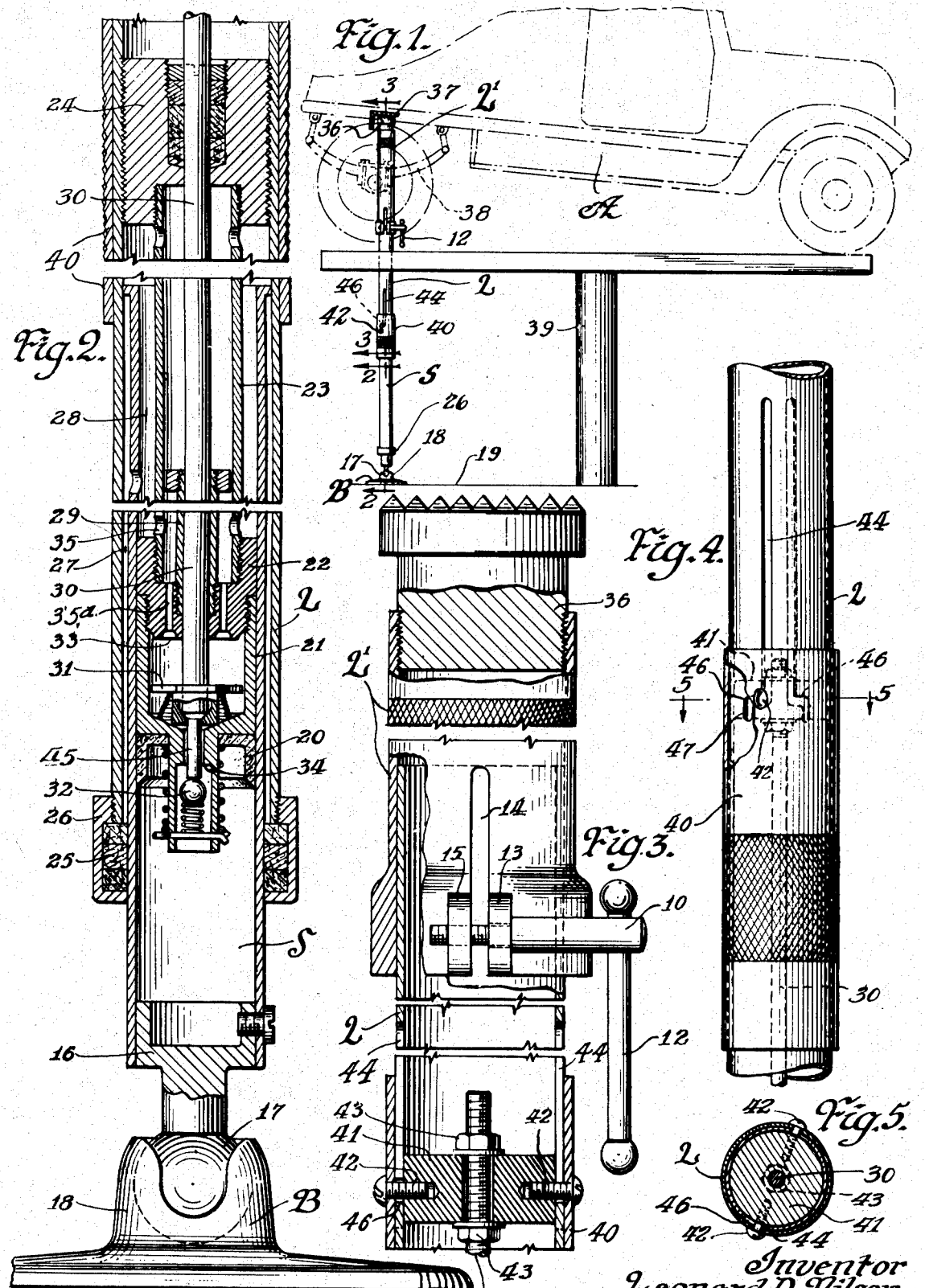
Inventor
Leonard D. Nilson
by Bair & Freeman
Attorneys.

Patented Jan. 16, 1940

2,187,279

UNITED STATES PATENT OFFICE 2,187,279

JACK STRUCTURE

Leonard D. Nilson, Wayzata, Minn.

Application July 18, 1938, Serial No. 219,794

15 Claims. (Cl. 254—93)

An object of my present invention is to provide a jack structure particularly adapted for use in connection with lifts for automobiles and for the purpose of elevating the chassis of an automobile to release the load on the springs thereof while the automobile is in elevated position on a lift or hoist during lubricating operations.

A further object is to provide a jack structure which is particularly adapted for relieving the load on the springs of an automobile while the automobile is on a lift so that the springs can be properly lubricated.

A further object is to provide a jack of this character which can be interposed between the floor surface and the chassis of the automobile and conveniently operated by an operator while in a standing position under the automobile, the operating means for the jack being telescopically mounted on the jack at a position intermediate its length to accomplish this purpose.

A further object is to provide a jack structure which is of compact post-like construction having lifting means within the jack and operating means for the lifting means extending through slots in the sides of the jack so that the operating means can be located exterior of the jack and intermediate the ends thereof.

Still a further object is to provide operating means for the jack for both raising and lowering the jack, such operating means being conveniently positioned for a jack of the post-like type disclosed without any levers or the like extending laterally from the jack into the way of the operator as he performs lubricating operations on an automobile with which the jack has been engaged.

With these and other objects in view my invention consists in the construction, arrangement and combination of the various parts of my device, whereby the objects contemplated are attained, as hereinafter more fully set forth, pointed out in my claims and illustrated in the accompanying drawing. Although my jack structure is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawing, in which:

Figure 1 is a diagrammatic side elevation of my jack structure showing it being used in connection with an automobile, the automobile being on a lift which is shown in elevated position.

Figure 2 is an enlarged vertical sectional view through the jack as taken on the line 2—2 of Figure 1.

Figure 3 is an enlarged sectional view as taken on the line 3—3 of Figure 1, the lower end of this figure being a continuation of the upper end of Figure 2.

Figure 4 is an enlarged side elevation of the central portion of the jack shown in Figure 1; and Figure 5 is a sectional view on the line 5—5 of Figure 4.

On the accompanying drawing I have used the reference character B to indicate a base and S a supporting member of my jack. Telescopically mounted on the supporting member S is a tubular lifting member comprising a lower section L and an upper section L'. The section L' is telescopically mounted on the section L and may be locked relative thereto by a set screw 10 having a handle 12. The set screw 10 extends rotatably through a lug 13 on the lower end of the section L' adjacent a slot 14 therein. On the other side of the slot 14 a lug 15 is threaded to receive the set screw 10 whereby when the set screw is tightened, the lugs may be drawn toward each other for clamping the section L' of the lifting member on the section L thereof.

The supporting member S is provided with a head 16 on its lower end terminating in a ball 17. The ball 17 is seated in a socket 18 of the base member B whereby the base member may be swung up along side the support S when storing the jack in a tool box or the like. During operation, the pivotal connection between the base and the support permit the jack to be set at an angle relative to the floor surface 19 (see Figure 1) if found desirable or necessary while using the jack.

The support S may be formed as a cylinder whereby a lifting piston 20 therein may effect an elevation of the lifting members L and L' when oil is pumped into the cylinder S below the piston 20. The piston 20 is connected with a sleeve 21 which in turn is connected by a fitting 22 and a second sleeve 23 to a head 24. The head 24 is screw threadedly mounted in the lifting member L as shown in Figure 2 whereby any movement of the lifting piston 20 will be imparted to the lifting member.

At the lower end of the lifting member L a packing gland 25 and a packing nut 26 are provided to prevent undesirable leakage of the oil from the jack structure to the exterior thereof as the space between the cylinder S and the lifting member L as indicated at 27 is a reservoir space for oil. A further reservoir space is provided at 28 between the cylinders S and 23.

For the purpose of pumping oil from the reservoir space 28 to the cylinder S below the lifting piston 20 I provide a pump structure including a pump cylinder 29 and a pump plunger 30 reciprocable therein. An intake valve 31 and an outlet valve 32 are normally seated against seats 33 and 34 respectively of the sleeve 21 and the fitting 22. These valves are spring urged to their closed positions and are fully disclosed in my co-pending application, Serial No. 132,565, filed March 23, 1937.

On the up stroke of the plunger 30, the valves 31 and 32 will close whereas they are shown in open position in Figure 2. After the valve 31 closes, further upward movement of the plunger 30 will result in a vacuum being formed between the valves 31 and 32 which will open the valve 31 for letting oil into the cylinder 29 through the seat 33 from the reservoir space 28. The lower end of the sleeve 23 is perforated as at 35a to permit the oil to flow from the oil reservoir 28. On the down stroke of the plunger 30, the valve 31 will be closed and the valve 32 opened so that the oil can be displaced from the space between the valves 31 and 32 to the space in the cylinder S below the lifting piston 20. It is therefore obvious that reciprocations of the plunger 30 will cause step by step raising of the piston and consequently the lifting members L and L'.

The lifting member L' is merely an extension of the lifting member L so as to give the jack a greater range of elevation. The lifting member L' has on its top end a head 36 adapted to engage the chassis of an automobile such as the cross member 37 thereof as shown in Figure 1. Thereby the chassis can be raised for releasing the tension on the springs 38 so that they can be properly lubricated while the lift structure 39 is supporting the automobile A in elevated position.

It is undesirable to have an operating member for the plunger 30 at the upper end of the jack structure. On the other hand it is desirable to have such an operating member located intermediate the ends of the jack. I accordingly provide an operating sleeve 40 telescopically mounted on the lifting member L and operatively connected with the pump plunger 30 by connector elements 41 and 42.

The connector element 41 is a disk slidable within the lifting member L and connected with the plunger 30 as by lock nuts 43. The elements 42 are screws extending through the sleeve 40 and through slots 44 into the connector element 41. The slots 44 extend longitudinally of the lifting member L whereby the sleeve 40 can be reciprocated therealong and the screws 42 extending through the slots 44 will transmit such reciprocations to the plunger 30.

As illustrated in Figure 2, the plunger 30 has an extension 45 which is adaptable to engage the outlet valve 32 and disengage it from its seat 34 after the lower end of the plunger 30 has disengaged the intake valve 31 from its seat 33. Each slot 44 at its lower end has a circumferentially extending portion 46 terminating in a downwardly extending portion 47. When the screws 42 are at the lower ends of the portions 47, the plunger 30 assumes the position shown in Figure 2 for permitting the oil to flow from under the lifting piston 20 back to the reservoir space 28. Thereby the jack can be lowered and its speed of descent controlled as desired. Normally, however, without rotating the operating sleeve 40, it can be reciprocated with the screws 42 remaining in the slots 44 for elevating operation of the jack.

My arrangement permits the use of a post-like jack structure and operation thereof from a convenient working position of the operator when lubricating an automobile on a hoist. All projecting parts are eliminated and it is only by special manipulation of the sleeve 40 that the jack can be lowered. Accordingly the chance of accidental lowering thereof is minimized.

Some changes may be made in the construction and arrangement of the parts of my jack structure without departing from the real spirit and purpose of my invention, and it is therefore my intention to cover by my claims, such modified forms of structure or use of mechanical equivalents, as may be reasonably included within their scope.

I claim as my invention:

1. In a jack structure of the character described, a vertical support, a lifting member slidable longitudinally relative thereto, lifting means within said lifting member and operatively connected therewith, said lifting means comprising a lifting piston, a pump within said lifting member for pumping oil to said lifting piston and an operating member for said pump comprising a piston rod, a handle slidable along the side of said lifting member, a slot in the wall of the lifting member, means extending through said slot for operatively connecting said handle and piston rod together, said slot extending longitudinally of said lifting member and having a circumferentially extending portion at one end thereof terminating in another longitudinally extending portion, said means of operative connection between said sleeve and piston rod being normally limited in its movement by said slot but capable of movement in said last mentioned longitudinally extending portion thereof after rotation in said circumferentially extending portion thereof and release means for said lifting mechanism of said jack structure operable by movement of said operative connection in said last mentioned longitudinally extending portion of said slot.

2. In a jack structure of the character described, a vertical support, a lifting member slidable longitudinally relative thereto, lifting means within said lifting member comprising a lifting piston, an operative connection between said lifting piston and said lifting member, a pump within said lifting member for pumping oil through said lifting piston and an operating member for said pump comprising a piston rod, a sleeve telescopically slidable on said lifting member and an operative connection through the wall of said lifting member from said sleeve to said piston rod, a slot in said wall, said operative connection extending through said slot, said slot extending longitudinally of said lifting member and having a circumferentially extending portion at one end thereof terminating in another longitudinally extending portion, and release means for said lifting mechanism of said jack structure operable by movement of said operative connection in said last mentioned longitudinally extending portion of said slot.

3. In a jack structure, a vertical support, a tubular element slidable thereon and having means at its upper end for engaging an object to be elevated by said jack, a lifting piston connected with said tubular element for raising it relative to said vertical support, means for pumping oil to the lifting piston including a pump having a vertically reciprocable member within said tubular element, said tubular element having a slot through the wall thereof and means exterior of said tubular element and extending through said slot for connection with said vertically reciprocable member for operating the pump when said means is reciprocated longitudinally of said tubular element, said means comprising a sleeve surrounding the tubular element.

4. In a jack structure, a vertical cylinder, object raising means slidable thereon and including a pair of tubular elements telescopically mounted relative to each other, a lifting piston within said cylinder and having a piston rod projecting above the upper end thereof, an operative connection between said piston rod and said slidable object raising means to raise the means when oil is pumped to the lifting piston and a pump within said piston rod for so pumping oil, said pump having an operating rod extending from the upper end of said piston rod, release means for said lifting piston, said operating rod being associated therewith to operate the release means when it is desired to permit the jack to lower and an operator for said operating rod comprising a tube surrounding said object raising means and having an operative connection through the wall thereof with said operating rod.

5. In a jack structure, a vertical support, object raising means slidable thereon and including a pair of tubular elements telescopically mounted relative to each other, a lifting piston to raise said object raising means when oil is pumped to the lifting piston and a pump for so pumping oil, said pump having an operating rod, release means for said lifting piston, said operating rod being associated therewith to operate the release means when it is desired to permit the jack to lower and an operator for said operating rod having an operative connection with said operating rod through the wall of said object raising means.

6. In a jack structure of the character described, a vertical support, a lifting sleeve slidable longitudinally relative thereto, lifting and lowering means for said lifting sleeve enclosed within said lifting sleeve and carried thereby, an operating sleeve surrounding said lifting sleeve, a slot in said lifting sleeve, connecting means between said lifting and lowering means and said operating sleeve for operating said lifting and lowering means, said slot having a portion normally receiving said connecting means during lifting operations and another part receiving said connecting means during lowering operations of the jack structure.

7. In a jack structure, a vertical support, a lifting sleeve slidable longitudinally relative thereto, lifting and lowering means for elevating and lowering said lifting sleeve relative to said vertical support, an operating member for said lifting and lowering means, said lifting sleeve having a slot, connecting means between said lifting and lowering means and said operating member, said slot having a portion normally receiving said connecting means during lifting operations and another part spaced circumferentially therefrom receiving said connecting means during lowering operations of the jack structure.

8. In a jack of the class described, a vertical supporting member, a tubular lifting member slidable telescopically thereon, lifting mechanism within said lifting member and operatively connected therewith, an actuating handle member for said lifting mechanism operatively connected therewith and telescopically slidable upon the exterior of said lifting member below the upper end thereof and extension means for said upper end and having object engaging means on its upper end for engaging an object to be elevated by said jack structure.

9. In a jack of the class described, a vertical supporting member, a lifting member slidable telescopically thereon, lifting mechanism within said lifting member and operatively connected therewith and an actuating handle member for said lifting mechanism operatively connected therewith and slidable along the exterior of said lifting member below the upper end thereof.

10. In a jack structure, a vertical cylinder, a lifting sleeve slidable longitudinally relative thereto, lifting means comprising a lifting piston operatively connected with said lifting sleeve and operable to raise it relative to said vertical cylinder, a pump to raise said lifting sleeve, an operating and release rod for said pump extending into said lifting sleeve, an operating sleeve on the exterior of said lifting sleeve for reciprocating said release rod and extending through a slot in said lifting sleeve, lowering mechanism for said jack structure, said slot having a substantially straight portion in which said operating sleeve operates normally for lifting operations and another portion in which said operating sleeve operates after it is rotated relative to said lifting sleeve, said operating and release rod then acting in its release capacity for operating said lowering mechanism.

11. In a jack structure, a vertical support, a lifting sleeve slidable longitudinally relative thereto, lifting means comprising a lifting piston operatively connected with said lifting sleeve and operable to raise it relative to said vertical cylinder, a pump to raise said lifting sleeve, an operating and release rod for said pump extending into said lifting sleeve, release means for said lifting means, an operating member on the exterior of said lifting sleeve for reciprocating and operating said operating and release rod, a slot in said lifting sleeve having a substantially straight portion through which said operating member extends normally for lifting operations and another portion through which said member extends when operating said operating and release rod to cause operation of said lowering mechanism.

12. A jack structure comprising telescopically extensible members having means for engaging a floor or the like on one end thereof and means on the other end thereof for engaging an object to be elevated thereby, lifting mechanism within said jack structure and an operating sleeve for said lifting mechanism which is telescopically movable along the exterior of said jack structure and connected through a slot in the wall thereof with said lifting mechanism.

13. In a jack structure, a vertical support, a piston slidable therein, a sleeve slidable relative to said vertical support, connected to said piston and adapted for engagement with an object to be raised by said jack structure, a chamber formed by the space in said support below said piston, a reservoir formed by the spaces in said support above said piston, fluid in said reservoir and in said chamber, a pump for forcing said fluid from said reservoir to said chamber through said piston, a vertically reciprocable operating member within said sleeve for operating said pump, a vertically reciprocable handle member encircling said sleeve, and a slot in said sleeve, said operating member being connected to said handle member through said slot.

14. In a jack structure, a vertical support, a piston slidable therein, a sleeve slidable relative to said vertical support, connected to said piston and adapted for engagement with an object to be raised by said jack structure, a chamber formed by the space in said support below said piston, a reservoir formed by the spaces in said support above said piston, fluid in said reservoir and in said chamber, a pump for forcing said fluid from said reservoir to said chamber through said piston, a vertically reciprocable operating member within said sleeve for operating said pump, a vertically reciprocable handle member encircling said sleeve, a slot in said sleeve, said operating member being connected to said handle member through said slot, said slot having a circumferentially extending portion at one end thereof terminating in another longitudinally extending portion, and release means for permitting return of said fluid from said chamber to said reservoir through said piston, said release means being operable by movement of said operating member in said last mentioned longitudinally extending portion of said slot.

15. In a jack structure, a vertical support, a piston slidable therein, a sleeve slidable relative to said vertical support and connected to said piston, a chamber formed by the space in said support below said piston, a reservoir formed by the spaces in said support above said piston, a fluid in said reservoir and in said chamber, a pump for forcing said fluid from said reservoir to said chamber, release means for permitting return of said fluid from said chamber to said reservoir through said piston, a vertically reciprocable handle member encircling said sleeve, a slot in said sleeve, an operating member for said release means, said operating member being connected to said handle member through said slot, said slot having a circumferentially extending portion at one end thereof terminating in another longitudinally extending portion, said release means being operable by movement of said operating member in said last mentioned longitudinally extending portion of said slot.

LEONARD D. NILSON.